United States Patent
Morris

(10) Patent No.: US 7,269,183 B2
(45) Date of Patent: Sep. 11, 2007

(54) SYSTEM AND METHOD FOR CONNECTING BLUETOOTH-ENABLED DEVICES TO A PERSONAL COMPUTER

(75) Inventor: Martin Morris, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 1198 days.

(21) Appl. No.: 09/844,625

(22) Filed: Apr. 27, 2001

(65) Prior Publication Data

US 2002/0159419 A1    Oct. 31, 2002

(51) Int. Cl.
*H04J 3/16* (2006.01)
*H04J 3/04* (2006.01)

(52) U.S. Cl. ........................ 370/466; 370/535

(58) Field of Classification Search ............... None
See application file for complete search history.

(56) References Cited

U.S. PATENT DOCUMENTS

| | | |
|---|---|---|
| 4,405,829 A | 9/1983 | Rivest et al. |
| 5,430,740 A | 7/1995 | Kivari et al. |
| 5,490,139 A | 2/1996 | Baker et al. |
| 5,572,528 A | 11/1996 | Shuen |
| 5,636,216 A | 6/1997 | Fox et al. |
| 5,652,751 A | 7/1997 | Sharony |
| 5,696,903 A | 12/1997 | Mahany |
| 5,699,353 A | 12/1997 | Kent |
| 5,708,655 A | 1/1998 | Toth et al. |
| 5,742,598 A | 4/1998 | Dunn et al. |
| 5,754,547 A | 5/1998 | Nakazawa |

(Continued)

FOREIGN PATENT DOCUMENTS

EP    0695059 A1    1/1996

(Continued)

OTHER PUBLICATIONS

Haartsen, Jaap, "Bluetooth—The universal radio interface for *ad hoc*, wireless connectivity," *Ericsson Review*, No. 3, pp. 110-117, (1998).

(Continued)

*Primary Examiner*—Andrew C. Lee
(74) *Attorney, Agent, or Firm*—McAndrews, Held & Malloy, Ltd.

(57) ABSTRACT

An interface which effects communication between first and second systems and includes a first arrangement for communicating with the first system using a first protocol and a second arrangement for communicating with the second system using a second protocol. At least one of the arrangements includes a mechanism for effecting wireless communication. In accordance with the invention, a third arrangement is included for translating data received from the first system in accordance with the first protocol into data adapted for the second system in accordance with the second protocol. In the illustrative embodiment, the inventive interface further includes an arrangement for translating data received from the second system in accordance with the second protocol into data adapted for the first system in accordance with the first protocol. In the illustrative embodiment, the second system is a Personal Computer, the first system is a peripheral adapted to be connected to the computer, the first protocol is a Bluetooth protocol and the second protocol is a Universal Serial Bus (USB) protocol. In the illustrative embodiment, the inventive interface leverages Universal Serial Bus technology, particularly "plug and play" capability, to simplify the installation and use of Bluetooth-enabled peripherals.

16 Claims, 3 Drawing Sheets

U.S. PATENT DOCUMENTS

| | | |
|---|---|---|
| 5,812,531 A | 9/1998 | Cheung et al. |
| 5,812,564 A | 9/1998 | Bonke et al. |
| 5,825,772 A | 10/1998 | Dobbins et al. |
| 5,835,061 A | 11/1998 | Stewart |
| 5,844,918 A | 12/1998 | Kato |
| 5,845,081 A | 12/1998 | Rangarajan et al. |
| 5,850,592 A | 12/1998 | Ramanathan |
| 5,854,899 A | 12/1998 | Callon et al. |
| 5,867,510 A | 2/1999 | Steele |
| 5,982,294 A | 11/1999 | Takayama et al. |
| 5,983,098 A | 11/1999 | Gerszberg et al. |
| 6,029,264 A | 2/2000 | Kobayashi et al. |
| 6,052,812 A | 4/2000 | Chen et al. |
| 6,255,800 B1* | 7/2001 | Bork ........................ 320/115 |
| 6,404,393 B1* | 6/2002 | Nelson et al. .............. 343/702 |
| 6,542,734 B1* | 4/2003 | Abrol et al. .............. 455/412.1 |
| 6,721,555 B1* | 4/2004 | Phillips et al. .............. 455/411 |
| 6,779,185 B1* | 8/2004 | Roukbi et al. .............. 719/321 |
| 6,792,247 B2* | 9/2004 | Law et al. ................. 455/41.2 |
| 7,072,056 B1* | 7/2006 | Greaves et al. ............ 358/1.15 |

FOREIGN PATENT DOCUMENTS

| WO | WO99/14897 A2 | 3/1999 |
|---|---|---|

OTHER PUBLICATIONS

"PMDF System Manager's Guide PMDF-Ref-5.1," http://www.geneseo.edu/pmdf/sysman/book_1.html#chapter_1, (Mar. 16, 1999).

"Specification of the Bluetooth System, Core, Version 1.0B," *Bluetooth SIG Specifications*, pp. 18-42, (Dec. 1, 1999).

Costello, Daniel J., Shu, Lin, "Error Control Coding", pp. 141-222, (Oct. 1982) Prentice-Hall.

* cited by examiner

SYSTEM AND METHOD FOR CONNECTING BLUETOOTH-ENABLED DEVICES TO A PERSONAL COMPUTER

BACKGROUND OF THE INVENTION

1. Field of the Invention

The present invention relates to wireless networks. More specifically, the present invention relates to methods for connecting Bluetooth-enabled devices to other systems.

2. Description of the Related Art

Computer networks allow multiple computers, peripherals and other information storage, retrieval or processing devices to share data. Each device attached to a network is typically referred to as a 'node'. Local Area Networks ("LANs") have historically consisted of nodes interconnected by physical media (e.g., coaxial cable, twisted pair wire, fiber optics, etc.). Recently wireless LANs, the nodes of which are not connected by means of a physical medium, have started to appear in the market. Wireless LANs communicate by means of infrared (IR), radio or other signals. One of the benefits of using wireless LANs is that cabling is not required. This is a particularly useful feature for mobile nodes such as laptop and notebook computers, PDAs (personal digital assistants), and the like. If equipped with an appropriate wireless adapter, the mobile nodes can move around within a predefined coverage area and remain connected to the network.

One method of implementing a wireless LAN is similar to a cellular phone network system. In this method wireless mobile nodes do not communicate directly with each other, but rather send all signals to a central base station, which then redirects the signals to the destination node. In certain systems of this type, each wireless mobile node is allowed to simultaneously participate in different wireless networks.

A wireless technology called 'Bluetooth' is under development to enable ease of synchronization and mobility for a plethora of corporate and consumer applications. Specifications relating to Bluetooth are set forth in BLUETOOTH SPECIFICATION VERSION 1.0B CORE, published in December 1999, hereinafter referred to as the "Bluetooth standard". Bluetooth technology will open up many possibilities for communication via wireless networks. One potential application of Bluethooth-based technology involves the connection of peripheral devices to a Personal Computer (PC) or similar electronic device.

For an application on a PC to use a Bluetooth-enabled peripheral device, software must be present on the PC which is "Bluetooth-aware"; that is, which runs the Bluetooth protocol layers and is able to support a Bluetooth-based connection between the PC and the peripheral device. The conventional means of doing this is to provide software components called "device drivers" for the PC. Each potential Bluetooth-enabled peripheral then has a separate device driver installed on the PC to provide this functionality.

However, the difficulties with device drivers are well known. Device drivers are specific to the operating system and often to a particular version of an operating system. In addition, device drivers may be difficult to install and can interact undesirably with each other.

On the other hand, the recent advent of the Universal Serial Bus (USB) has spurred operating system manufacturers to provide similar drivers for common peripherals attached to a PC via a USB port. On Windows-based PCs, for example, these drivers are "plug and play"; Windows detects the attachment of a device to a USB port and automatically installs the appropriate driver. Unfortunately, the plug and play capability of the Windows environment has heretofore not been extensible to peripheral devices over wireless links.

What is needed then, is a system or method for taking advantage of USB technology, and particularly the "plug and play" capability thereof, to simplify the installation and use of Bluetooth-enabled and other wireless peripherals.

SUMMARY OF THE INVENTION

In summary, the present invention provides an interface for effecting communication between first and second systems. The interface includes a first arrangement for communicating with the first system using a first protocol and a second arrangement for communicating with the second system using a second protocol. At least one of the arrangements includes a mechanism for effecting wireless communication. In accordance with the present teachings, a third arrangement is included for translating data received from the first system in accordance with the first protocol into data adapted for the second system in accordance with the second protocol.

In the illustrative embodiment, the inventive interface further includes an arrangement for translating data received from the second system in accordance with the second protocol into data adapted for the first system in accordance with the first protocol. In the illustrative embodiment, the second system is a Personal Computer, the first system is a peripheral adapted to be connected to the computer, the first protocol is a Bluetooth protocol and the second protocol is a Universal Serial Bus (USB) protocol. In this context the inventive interface leverages USB technology, particularly "plug and play" capability, to simplify the installation and use of Bluetooth-enabled peripherals.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
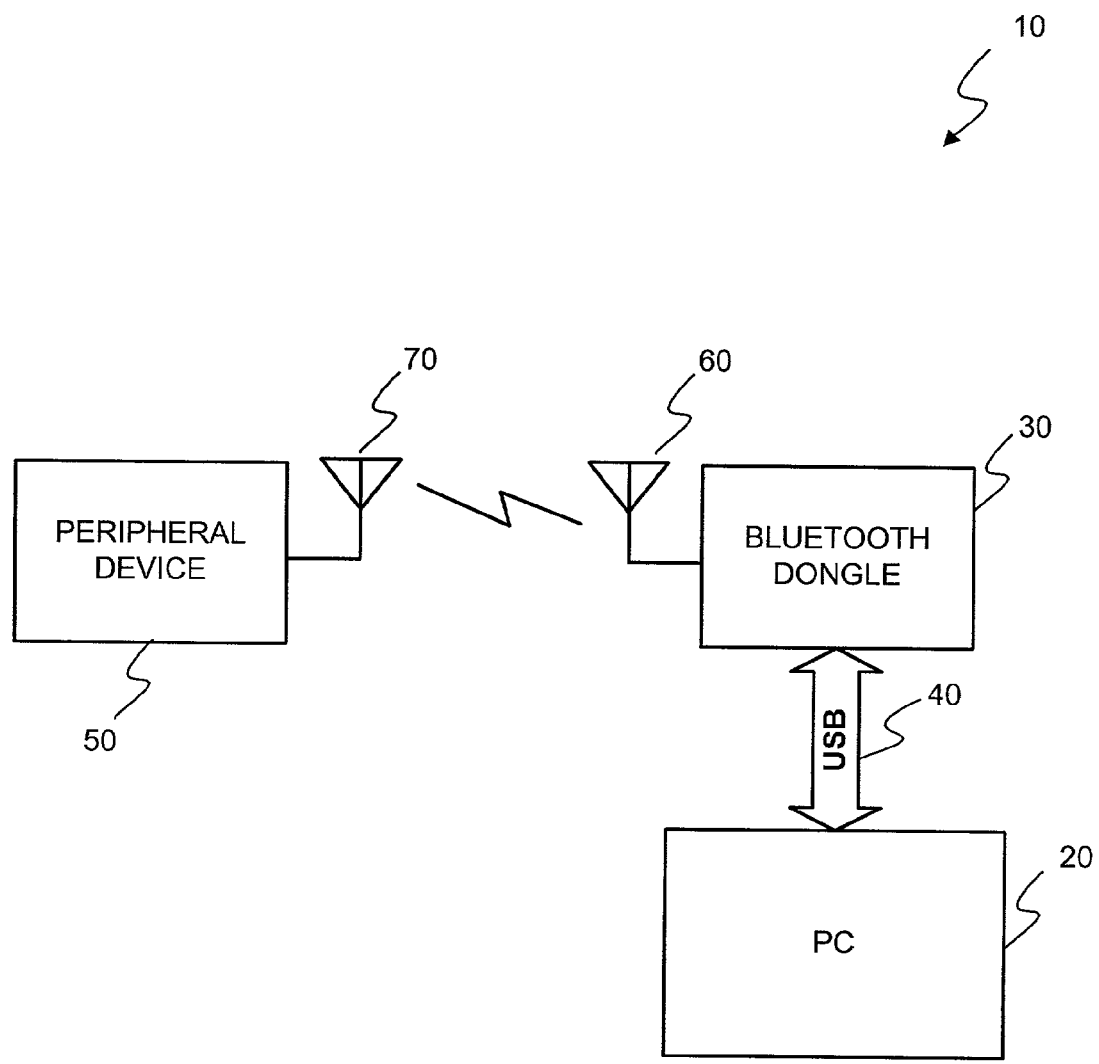
FIG. 1 is a block diagram of a system with a Bluetooth-enabled peripheral connected to a PC via a Bluetooth/USB interface of the present invention.

FIG. 1 is a block diagram of a system with a Bluetooth-enabled peripheral connected to a PC via a Bluetooth/USB interface of the present invention. The system 10 includes a PC 20 that is connected to a Bluetooth/USB interface (or "Dongle") 30 via a conventional USB interface 40. The Bluetooth/USB interface 30 communicates with a Bluetooth-enabled peripheral device 50 via antennas 60 and 70, respectively. Those skilled in the art will appreciate that the present invention is not limited to the application shown nor the configuration thereof. That is, the Bluetooth/USB interface 30 may be connected to a device via a common interface, e.g., a USB interface, to effect communication with another device or system such as a PC via a Bluetooth link.

Figure 2:
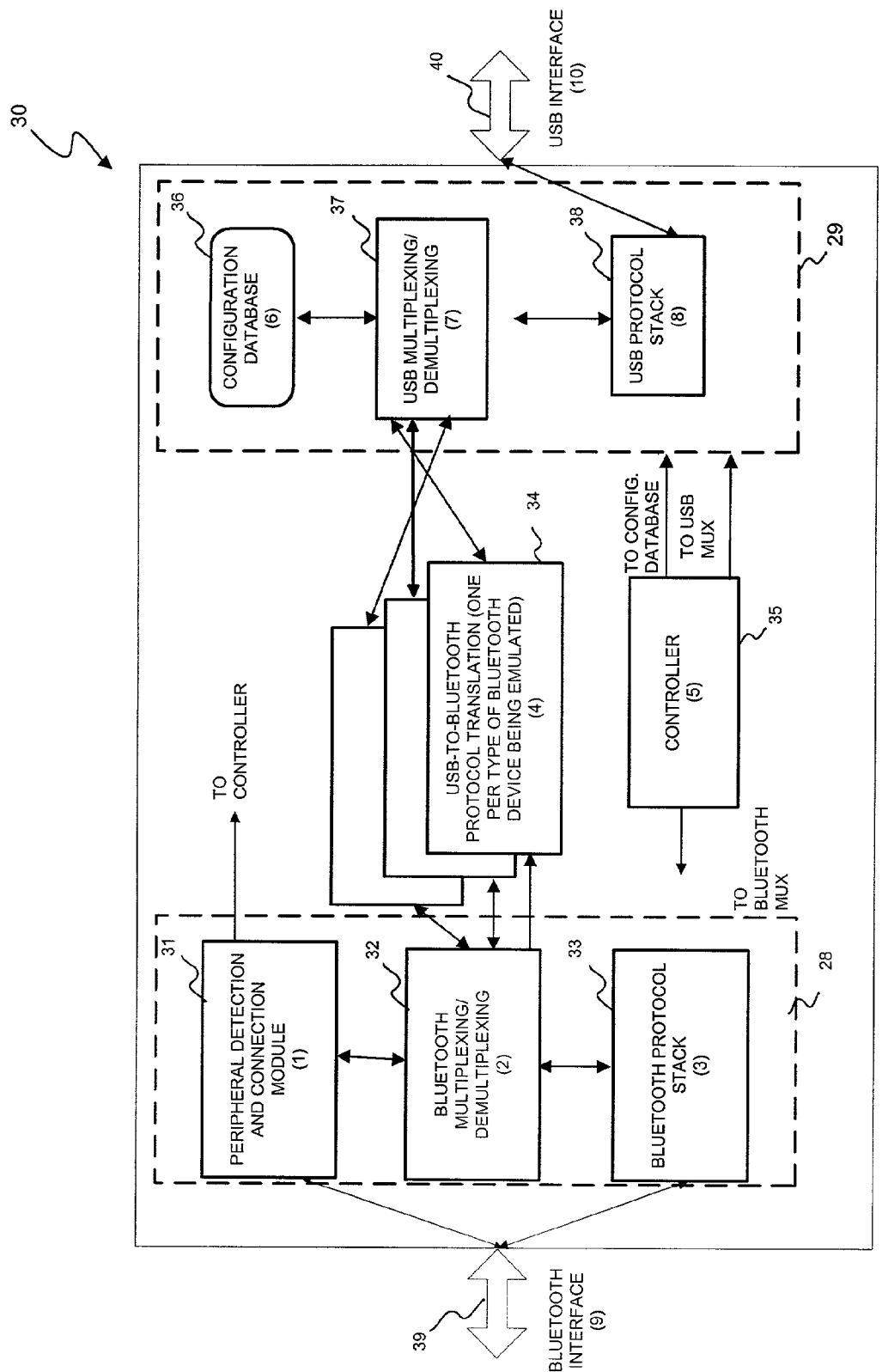
FIG. 2 is a block diagram of an illustrative embodiment of the Bluetooth/USB interface of the present invention.

FIG. 2 is a block diagram of an illustrative embodiment of the Bluetooth/USB interface 30 of the present invention. The interface includes a Bluetooth device communication module 28, a USB communication module 29 and a USB-to-Bluetooth protocol translator 34 interposed therebetween. The Bluetooth device communication module 28 includes a peripheral detection and connection module 31, a Bluetooth multiplexer/demultiplexer 32 and a Bluetooth protocol stack 33. The USB communication module 29 includes a configuration database 36, a USB multiplexer/demultiplexer 37 and a USB protocol stack 38. The Bluetooth/USB interface 30 communicates through a conventional Bluetooth interface 39 and the USB interface 40. The interface 30 further includes a controller 35, which will typically comprise a microprocessor disposed to execute control software stored in associated memory (not shown).

Conventionally, when a peripheral device is plugged in to a USB port of a PC, the operating system engages in a standard dialog with the device to determine an appropriate driver. The present invention incorporates standard device emulation software into the Bluetooth/USB interface 30 allowing the interface 30 to "spoof" the attachment of one or more peripheral devices. The interface 30 then proceeds to translate between messages transferred over the Bluetooth wireless link and USB messages such that the PC 20 believes that the peripheral device 50 is wire-attached via the USB port rather than via the Bluetooth wireless link. This process is described in more detail below.

The peripheral detection and connection module 31 is connected to the Bluetooth interface 39 and operates under the control of the controller 35. The peripheral detection and connection module 31 may be implemented in software. The peripheral detection and connection module 31 detects a connection of a peripheral device by receipt of a Bluetooth connection request message from the peripheral device 50 and a subsequent exchange of messages with the device 50 (to determine its type). Further, the peripheral detection and connection module 31 "handshakes" with the PC 20 to emulate the insertion of a device onto the USB bus of the device 50 (and emulates the removal of the device when necessary).

The Bluetooth protocol stack 33 is a software module which functions in accordance with the Bluetooth standard.

As discussed more fully below, the controller 35 is configured to respond to inquiries from, and establish connections with, appropriate Bluetooth-enabled peripheral devices. In operation, the controller 35 monitors the peripheral detection and connection module 31 for the arrival or departure of Bluetooth-enabled peripherals. When a Bluetooth-enabled peripheral is detected, the controller 35 establishes a Bluetooth connection and determines the type of emulation required for the newly connected device using a table lookup or other suitable technique. Next, the controller 35 informs the PC 20 of the "insertion" of a newly connected device. The controller 35 then switches in the appropriate protocol translation module 34 via the Bluetooth multiplexer 32 and the USB multiplexer 37. A set of protocol translation modules 34 is provided, one for each type of device to be supported. These modules enable the controller 35 to relays messages between the PC 20 and the device 50 via the Bluetooth protocol stack 33 and the USB protocol stack 38, translating as necessary between the ports to make the Bluetooth-attached peripheral 50 emulate a USB-attached peripheral. Each of the translators 34 may be implemented with a simple state machine or using other means well within the capability of one of ordinary skill in the art. The USB communication protocol stack 38 should include "plug and play" support.

When a device fails to respond (possibly due to moving out of range) the controller 35 announces to the PC 20 that the device has been "removed".

Figure 3:
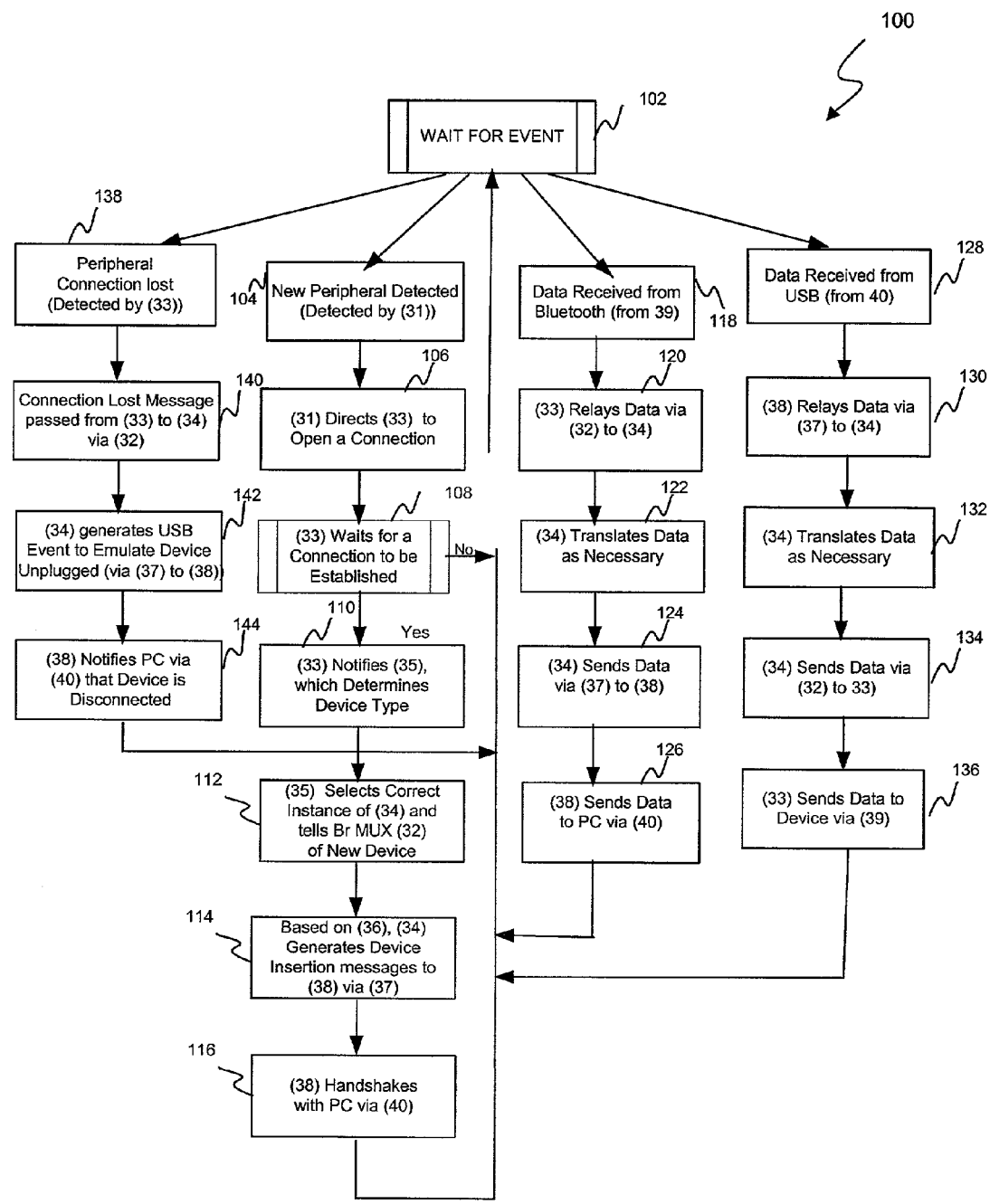
FIG. 3 is a flow diagram showing an illustrative implementation of a method of operation of a Bluetooth/USB interface in accordance with the present teachings.

FIG. 3 is a flow diagram showing an illustrative implementation of a method of operation of a Bluetooth/USB interface implemented in accordance with the present teachings. In accordance with the illustrated method 100, at step 102, the system 30 waits in idle mode for an event to occur. At step 104, a peripheral device is detected by the peripheral detection and connection module 31. At step 106, the peripheral detection and connection module 31 directs the Bluetooth protocol stack 33 to open a connection. At step 108, the Bluetooth protocol stack 33 waits for a connection to be established. If no connection is established before a predetermined time period (i.e., the device 'times-out'), then the interface returns to step 102 to wait for another event. If, however, a connection is established at step 108, then, at step 110, the Bluetooth protocol stack 33 notifies the controller 35 of the connection and the control software 35 determines the device type. At step 112, the control software 35 selects the correct protocol translation module 34 and tells the Bluetooth multiplexer 32 of the new device 50. At step 114, based on configuration data stored in the configuration database 36, the translation module 34 generates device insertion messages to the USB protocol stack 38 via the USB multiplexer 37. At step 116, the USB protocol stack 38 handshakes with the PC 20 via the USB interface 40 and the interface 30 returns to step 102 to wait for another event.

In the event that data is received from the peripheral device 50 via the Bluetooth interface 39 (step 118) then, at step 120, the Bluetooth protocol stack 33 relays the data via the Bluetooth multiplexer 32 and the appropriate USB-to-Bluetooth protocol translation module 34. At step 122, the appropriate protocol translation module translates the data as necessary. Next, at step 124, the translation module 34 sends the data to the USB protocol stack 38 via the USB multiplexer 37. Finally, at step 126, the USB protocol stack 38 sends data to the PC 20 via the USB interface 40 and the interface 30 returns to step 102 to wait for another event.

If, at step 128, data is received from the PC 20 via the USB interface 40, then at step 130, the USB protocol stack 38 relays data to an appropriate translation module 34 via the USB multiplexer 37. Next, at step 132, the selected translation module 34 translates the data as necessary. At step 134, the translation module 34 sends data via the Bluetooth demultiplexer 32 to the Bluetooth protocol stack 33. Finally, at step 136, the Bluetooth protocol stack 33 sends the translated data to the device 50 via the Bluetooth interface 39 and the interface 30 returns to step 102 to wait for another event.

If, at step 138, the connection to the peripheral device is lost, then at step 140, a 'connection lost' message is passed from the Bluetooth protocol stack to the protocol translation module 34 via the Bluetooth multiplexer 32. Next, at step 142, the protocol translation module 34 generates USB event code to emulate a device being unplugged and sends it to the USB protocol stack 38 via the USB multiplexer/demultiplexer 37. Finally, at step 144, the USB protocol stack notifies the PC 20 via the USB interface 40 that the device 50 is disconnected and the interface 30 returns to step 102 to wait for another event.

Thus, by incorporating the present invention in a Bluetooth Dongle, Bluetooth-enabled peripheral devices, which have a standard USB-attached analog, may be logically connected to any PC without installing custom software on the PC and without any of the drawbacks of custom drivers. Conventionally, as new versions of operating systems are produced, drivers for standard USB peripherals such as modems, printers, mice, etc. are updated if necessary, and tested by the OS manufacturer for interoperability. However, peripherals attached to a PC via an interface implemented in accordance with the present teachings may continue to operate without requiring custom driver development.

Thus, the present invention has been described herein with reference to a particular embodiment for a particular application. Those having ordinary skill in the art and access to the present teachings will recognize additional modifications, applications and embodiments within the scope thereof. For example, the invention may be configured to support multiple peripheral devices simultaneously connected via a simple Bluetooth radio and a single USB port. The extension to this case is straightforward to one skilled in the art and only requires configuring the controller 35 to keep track of multiple Bluetooth connections and direct the data through the appropriate translation module 34. Both the Bluetooth and USB protocols contain support for simultaneous connection of multiple devices.

It is therefore intended by the appended claims to cover any and all such applications, modifications and embodiments within the scope of the present invention.

What is claimed is:

1. An interface unit for effecting communication between a device and an electronic system, the interface unit comprising:
   a device communication module that communicates with the device over a wireless link in accordance with a first protocol;
   a system communication module that communicates with the electronic system using a second protocol; and
   a translation unit, operatively connected to the device communication module and to the system communication module, that translates data received from the device in accordance with the first protocol into translated data adapted for the electronic system in accordance with the second protocol,
   wherein the system communication module comprises a Universal Serial Bus (USB) protocol stack, the interface unit comprising a USB interface operatively connected to the USB protocol stack, and
   wherein the system communication module comprises a USB multiplexing and demultiplexing arrangement operatively connected to the translation unit and to the USB protocol stack.

2. The interface unit of claim 1 wherein the translation unit is operative to translate information received from the electronic system in accordance with the second protocol into translated information adapted for the device in accordance with the first protocol.

3. The interface unit of claim 1 wherein the electronic system comprises a personal computer and the second protocol is a USB protocol, the interface unit being connected to a USB port of the personal computer.

4. The interface unit of claim 1 wherein the device communication module comprises a peripheral detection and connection module.

5. The interface unit of claim 4 comprising a Bluetooth interface operatively connected to the peripheral detection and connection module, the communication module comprising a Bluetooth protocol stack operatively connected to the Bluetooth interface.

6. The interface unit of claim 1 wherein the communication module comprises a Bluetooth multiplexing/demultiplexing arrangement operatively connected to the translation unit.

7. The interface unit of claim 1 wherein the system communication module comprises a configuration database operatively connected to the USB multiplexing and demultiplexing arrangement.

8. The interface unit of claim 1 wherein the first protocol comprises the Bluetooth protocol and the second protocol comprises the USB protocol, the translation unit being operative to translate information received from the electronic system in accordance with the USB protocol into translated information adapted for the device in accordance with the Bluetooth protocol.

9. A system for effecting communication with a device over a wireless link in accordance with a first protocol, the system comprising:
   a personal computer having an interface compliant with a second protocol; and
   an interface unit in communication with the personal computer through the interface, the interface unit comprising:
      a device communication module that transmits information to, and receiving data from, the device in accordance with the first protocol;
      a system communication module that communicates with the personal computer using a second protocol; and
      a translation unit, operatively connected to the device communication module and to the system communication module, that translates the data received from the device in accordance with the first protocol into translated data adapted for the electronic system in accordance with the second protocol,
   wherein the interface unit runs emulation software that spoofs a connection as if the interface unit was not acting as an intermediary from the perspective of the personal computer.

10. The system of claim 9 wherein the translation unit is operative to translate information received from the electronic system in accordance with the second protocol into translated information adapted for the device in accordance with the first protocol.

11. The system of claim 9 wherein the second protocol is a Universal Serial Bus (USB) protocol, the interface comprising a USB port of the personal computer.

12. The system of claim 9 wherein the device communication module comprises a peripheral detection and connection module.

13. The system of claim 12 comprising a Bluetooth interface operatively connected to the peripheral detection and connection module, the communication module comprising a Bluetooth protocol stack operatively connected to the Bluetooth interface.

14. The system of claim 9 wherein the communication module comprises a Bluetooth multiplexing and demultiplexing arrangement operatively connected to the translation unit.

15. The system of claim 9 wherein the system communication module comprises a USB protocol stack, the interface unit comprising a USB interface operatively connected to the USB protocol stack.

16. The system of claim 15 wherein the system communication module comprises a USB multiplexing and demultiplexing arrangement operatively connected to the translation unit and to the USB protocol stack.

* * * * *